United States Patent [19]

Terrasi

[11] Patent Number: 5,100,224
[45] Date of Patent: Mar. 31, 1992

[54] INSTRUMENT FLIGHT SIMULATION VIEW LIMITING DEVICE

[76] Inventor: John D. Terrasi, R.D. #2, Box 17, Pittsfield, Pa. 16340

[21] Appl. No.: 580,095

[22] Filed: Sep. 10, 1990

[51] Int. Cl.$^5$ .................................................. G02C 9/00
[52] U.S. Cl. ..................................... 351/47; 434/35; 351/57
[58] Field of Search .................. 351/44, 45, 46, 47, 351/57, 59; 434/35, 36

[56] References Cited

U.S. PATENT DOCUMENTS

| | | | |
|---|---|---|---|
| 2,870,446 | 1/1959 | Mitchell | 2/12 |
| 3,225,459 | 12/1965 | Wilstein | 35/12 |
| 3,575,497 | 4/1971 | LeBlanc | 351/47 |
| 3,629,870 | 12/1971 | Paisley | 2/15 |
| 4,698,022 | 10/1987 | Gilsen | 351/47 |

Primary Examiner—Paul M. Dzierzynski
Attorney, Agent, or Firm—Lovercheck and Lovercheck

[57] ABSTRACT

A view limiting device especially suited for use in instrument flight training and simulated instrument flying. This device is adapted to clip onto a pair of spectacles and is swingable from a first view restricting position to a second unrestricted position of the line of vision of the wearer. The device is also made to fit over an instrument procedure chart book for storage. An alternate model can be used without spectacles.

7 Claims, 2 Drawing Sheets

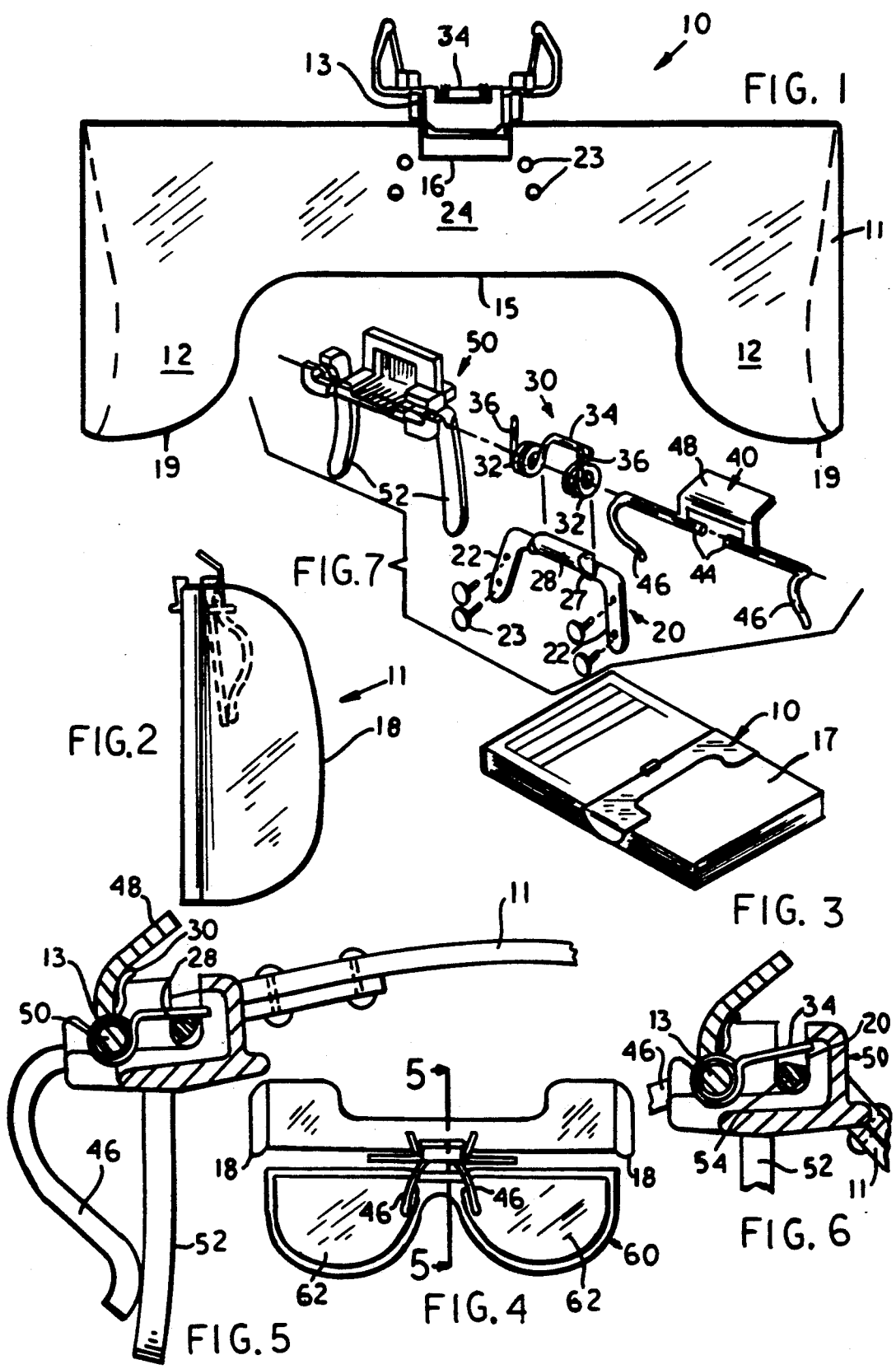

INSTRUMENT FLIGHT SIMULATION VIEW LIMITING DEVICE

BACKGROUND OF THE INVENTION

Applicant is aware of U.S. Pat. Nos. 2,870,446 to Mitchell; 3,225,459 to Wilstein and 3,629,870 to Paisley which show different designs of instrument flight training devices. However, none of these prior art Patents show an instrument training device that has the important structural features that give the advantages of the present invention.

U.S. Pat. No. 3,575,497 to Leblanc shows an example of sun glasses with a flip-up feature.

Another view limiting device currently used for instrument pilot training is sold under the trade name "Foggles". Foggles are basically conventional glasses frames with lenses that have the upper part made of tinted glass. These view limiting devices do not have the important features of applicant's device. Such view limiting devices are particularly uncomfortable when used with a radio head set.

SUMMARY OF THE INVENTION

The view limiting device shown herein conveniently attaches to the eye glasses of a student instrument pilot and is capable of unrestricted visual position and can be moved to a down restricted visual position. The device is designed to aid in training and/or development of skills requiring complete attention to a restricted visual field, as for example, by computer operators or visually distracted individual learning to concentrate their visual field. The device has primary benefits for prescription glasses users for use as a light weight, unemcumbering view limiting device. The device is useful for non-prescription eye glasses users wearing clear or tinted lenses or with lensless frames. The device is especially useful to pilots, especially those who wear glasses in instrument training and in simulated instrument flying. The classic plastic "hood" is exceptionally uncomfortable and the most recent innovation in instrument training devices are quite cumbersome when used with glasses, especially around the ear areas. Headsets add even more congestion to that area. With the device according to the present invention, a pilot can properly execute a simulated instrument approach to minimum altitude then, just flip up the view limiting device as instantaneously as the transition from instrument condition to visual conditions which requires minimum disruption of the immediate task of landing.

The shape and size of the unrestricted viewing area can easily be made to order since a lightweight, plastic sheet material is used in construction of the device. Accordingly, simple cookie mold type cutting or steel rule dies can be used, and uncut material can be obtained for customized cutting by a separate entity. The support for the device can accommodate eye glasses or be made with a nose rest and temples.

The device according to the invention is intended to aid those individuals who wear eye glasses while instrument training. The existing plastic "hood" is very clumsy and "Foggles" may scratch the lens or otherwise damage an expensive pair of eye glasses. The device according to the invention can be worn on eye glass frames equipped with clear glass or without glass and eye glass frames having temples and a nose rest.

It is an object of the invention to provide an improved eye shade which is extremely lightweight and only restrictive to vision.

Another object is to provide a view limiting device that is especially suited for instrument pilot training.

Another object is to provide a view limiting device that is simple in construction, economical to manufacture and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

BRIEF DESCRIPTION OF THE DRAWING

FIG. 1 is a front view of the view limiting device according to the invention.

FIG. 2 is a side view of the view limiting device shown in FIG. 1.

FIG. 3 is an isometric view of the view limiting device supported in stored position on an instrument approach procedure book.

FIG. 4 is a front view of the view limiting device according to the invention, shown on a pair of spectacles, in the flipped up position.

FIG. 5 is a cross sectional view taken on line 5—5 of FIG. 4 with the view limiting device in a flipped up position.

FIG. 6 is a cross sectional view similar to FIG. 5 with the view restrictor in a flipped up position.

FIG. 7 is an exploded view showing the essential parts of the invention.

DESCRIPTION OF THE PREFERRED EMBODIMENT

Figure 8:
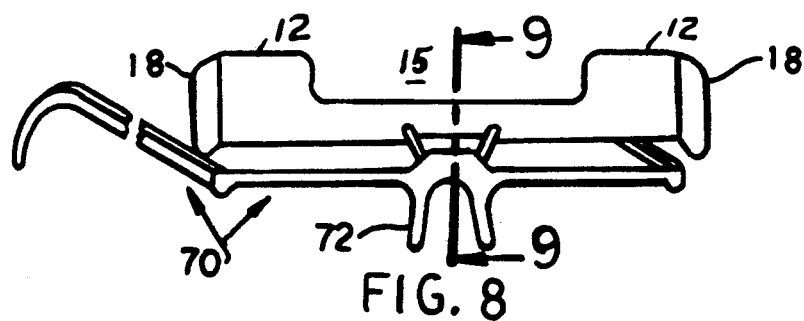
FIG. 8 is a view similar to FIG. 4 of another embodiment of the invention.

Now, with more particular reference to the drawings, view limiting device 10 comprises view limiting member 11, clip means 13, bridge 20, spring 30, clasp 40 and support 50 for supporting view limiting device 10 on a pair of spectacles 60 or support 70 as a lensless frame. Clip means 13 may be made generally similar to the corresponding parts of U.S. Pat. No. 3,575,497.

View limiting member 11 comprises a single integral sheet of semi opaque non-metallic material having intermediate part 24, eye pieces 12, intermediate notch 16, recess 15, first and second side panels 18. First and second side panels 18 are disposed generally at right angles to intermediate part 24 and spaced apart slightly wider than the width of an adult head, so that view limiting member 11 fits over the forehead of an adult person and is about the width of an instrument procedure chart book 17 for convenient storage. Recess 15 extends into view limiting member 11 approximately half the height of view limiting member 11. Intermediate part 24 restricts forward vision, but recess 15 provides downward and forward vision of an aircraft instrument panel. Recess 15 is cut into eye piece 12 so that downward and forward vision, without excessive head movement, favors the right side to include a scan of the engine gauges which are located on the right side of the instrument panel in most aircraft.

Eye pieces 12 and intermediate part 24 have a generally straight top edge which joins the outwardly and downwardly extending upper edge of first and second side panels 18. The edges of side panels 18 extend downwardly and inwardly to form the lower edge of second side panels 18. Bottom edge 19 of eye pieces 12 curves upwardly and inwardly to the edge of recess 15.

Bridge 20 is generally U-shaped and has spaced legs 22 which are connected together by intermediate pivot member 28, which forms a toggle. Legs 22 are held to intermediate part 24 by rivets 23. Intermediate pivot member 28 is non-circular in cross section, having two flat sides 27 and one circular side. Connecting member 34 of spring 30 successively engage flat sides 27 and the circular side of intermediate pivot member 28 and hold view limiting device 10 in an up, non-restricting position or in a down, view-restricting position.

Spring 30 has two spaced helical parts 32 connected together by connecting member 34. Helical parts 32 are received on inwardly extending ends 44 of clasp 40. Ends 36 of spring 30 engage handle 48 on clasp 40, while connecting member 34 of spring 30 rest on one or the other of flat sides 27 of bridge 20. Thus, bridge 20 and spring 30 act together as a toggle spring engaging one or the other of flat sides 27 or the radius of intermediate member 20 to selectively urge view limiting member 11 to a lowered use position, or to a raised position, as shown in FIGS. 4 and 5.

Clasp 40 has a frame, which has laterally spaced prongs 46 connected together by handle 48. Prongs 46 are adapted to rest on the rear of lens 62 of spectacles 60 and may be be urged toward the lens 62 by spring 30. Laterally spaced fingers 52, which are fixed to and integral with support 50, are adapted to rest on the rear of lens 62 of spectacles 60 so that lens 62 is gripped by prong 46 and fingers 52. Spaced notches 54 in support 50 receive intermediate pivot members 28 of bridge 20. Second support 70 has integral nose rest 72 and temples 74 for attachment to ears and spring 30 has downward ends 36 which engage nose rest 72 in liew of clasp 40.

Figure 9:
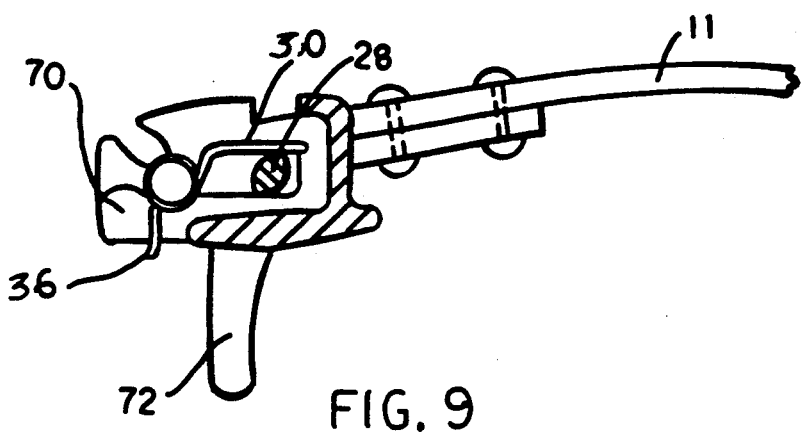
FIG. 9 is a cross sectional view similar to FIG. 6, taken on line 9—9 of FIG. 8.
Figure 10:
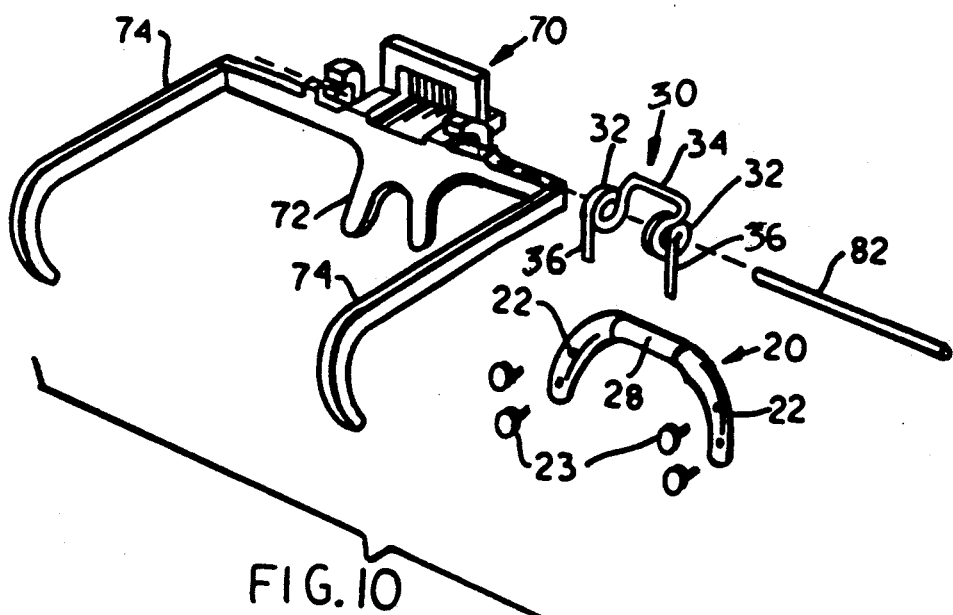
FIG. 10 is an exploded view of another embodiment of the invention shown in FIGS. 8 and 9.

Now with more particular reference to the embodiment of the invention shown in FIGS. 8, 9 and 10, FIG. 8 is a front view of the device shown with lensless frames in the form of second support 70 and nose rest 72. Eye pieces 12 have side panels 18 and are shown in a flipped up position.

FIG. 9 is a cross sectional view taken on line 9—9 of FIG. 8 showing frame 70, temples 74 and nose rest 72. View limiting member 11 having side panels 18, spring 30. Spring 30 has spaced helical parts 32, connecting member 34 with ends 36. Bridge 20 has intermediate member 28 connecting spaced legs 22. Pin 82 is received in helical parts 32 of spring 30.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination a view limiting device comprising a view limiting member and a clip means adapted to support said view limiting device on a pair of spectacles,
   said clip means comprising pivot means allowing said view limiting member to be swung from a position above said spectacles to a view limiting position in front of said spectacles,
   said view limiting member being formed from a single integral generally rectangular sheet of opaque non-metallic material,
   said view limiting member comprising spaced eye pieces, an intermediate part, a first side panel and a second side panel,
   said first side panel and said second side panel spaced apart about the width of an adult head and being disposed generally at right angles to said intermediate part and integrally attached to said eye pieces,
   said eye pieces and said intermediate part defining a recess,
   said recess being approximately equal to a space between the outside edges of an adult's eyes providing downward and forward vision of an aircraft instrument panel.

2. The combination recited in claim 1 wherein said pivot means comprises toggle means for urging said view limiting member to a lowered use position and to a raised position.

3. The combination recited in claim 2 wherein said clip means comprises a spaced pair of prongs and laterally spaced fingers,
   said fingers and said prongs adapted to receive said spectacles therebetween,
   a spring urging said fingers toward said prongs.

4. In combination a view limiting device for aircraft pilot training and clip means for supporting said view limiting device on spectacles for movement into the line of forward sight of the user, to a position out of the line of sight,
   said view limiting device having a view limiting member made of a generally rectangular sheet of opaque material having a top edge, a bottom edge and two side edges,
   a recess formed in an intermediate part adjacent a bottom edge of said view limiting device,
   two spaced eye pieces integrally connected by said intermediate part,
   said intermediate part extending downward to said recess from said top edge of said view limiting member about half as far as said eye pieces providing said recess for downward and forward vision,
   a first side panel and a second side panel integrally attached to said eye pieces and disposed generally at an obtuse angle for limiting lateral vision.

5. The combination recited in claim 4 wherein said eye pieces have lower edges adjacent one another forming sides of said recess that curve upwardly and inwardly and join lower edges of said intermediate part.

6. The combination recited in claim 5 wherein said first and second side panels each have an edge that inclines from said top edge of said view limiting member downwardly and outwardly, then downwardly and inwardly and joins said lower edge of a said eye piece.

7. The combination recited in claim 4 wherein said clip means includes said toggle means for supporting said view limiting member in first view limiting position for simulated instrument flying, and is a second position out of the line of sight of the wearer for non-instrument use.

* * * * *